(12) United States Patent
Chen et al.

(10) Patent No.: US 9,977,123 B2
(45) Date of Patent: May 22, 2018

(54) AUTOMATED TRACK PROJECTION BIAS REMOVAL USING FRECHET DISTANCE AND ROAD NETWORKS

(71) Applicant: BAE Systems Information and Electronic Systems Integration Inc., Nashua, NH (US)

(72) Inventors: Lingji Chen, Acton, MA (US); Balasubramaniam Ravichandran, Winchester, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 331 days.

(21) Appl. No.: 14/699,645

(22) Filed: Apr. 29, 2015

(65) Prior Publication Data
US 2015/0338515 A1    Nov. 26, 2015

Related U.S. Application Data

(60) Provisional application No. 62/000,839, filed on May 20, 2014.

(51) Int. Cl.
G01S 13/86    (2006.01)
G01S 7/04    (2006.01)
G01S 13/72    (2006.01)

(52) U.S. Cl.
CPC ............ G01S 13/867 (2013.01); G01S 7/04 (2013.01); G01S 13/723 (2013.01)

(58) Field of Classification Search
CPC ................ G01S 7/04; G01S 13/867

USPC ........................................... 342/52, 176–178
See application file for complete search history.

(56) References Cited

U.S. PATENT DOCUMENTS

| 7,701,592 | B2 * | 4/2010 | Saint Clair | G01B 11/002 |
| | | | | 356/5.11 |
| 9,256,681 | B2 * | 2/2016 | Kenefic | G06F 17/30705 |
| 2012/0127030 | A1 * | 5/2012 | Arthur | G01S 19/45 |
| | | | | 342/357.28 |
| 2013/0052614 | A1 * | 2/2013 | Mollicone | G09B 19/167 |
| | | | | 434/65 |
| 2014/0129194 | A1 * | 5/2014 | Zhdanov | G01V 99/005 |
| | | | | 703/2 |

(Continued)

OTHER PUBLICATIONS

X. Lin, Y. Bar-Shalom, and T. Kirubarajan, "Multisensor multitarget bias estimation for general asynchronous sensors," Aerospace and Electronic Systems, IEEE Transactions on, vol. 41, No. 3, pp. 899-921, Jul. 2005, United States.

(Continued)

*Primary Examiner* — Marcus E Windrich
(74) *Attorney, Agent, or Firm* — Hayes Soloway; Sand && Sebolt, LPA; Scott J. Asmus (57) ABSTRACT

A system and method for projecting target tracks produced by a remote tracker onto a surface of the Earth to obtain projected tracks is provided. Projection bias in a projected track from the remote tracker projected onto a planar map is removed by computing a discrete Frechet distance from a polygonal curve associated with a track derived from the remote tracker to a corresponding polygonal curve on the planar map. A correspondence between the projected track and a track on the planar map is automatically established. A projection bias is removed based on the correspondence.

20 Claims, 8 Drawing Sheets

(56) References Cited

U.S. PATENT DOCUMENTS

2015/0369615 A1* 12/2015 Dzyuba ............... G01C 21/32
                                                       701/409
2016/0291149 A1* 10/2016 Zeng ................. G01S 13/931

OTHER PUBLICATIONS

J. P. Ferry, "Exact bias removal for the track-to-track association problem," Information Fusion, 2009 12th International Conference on Computational Science and Engineering. IEEE, Jul. 2009, pp. 1642-1649, Canada.

D. J. Papageorgiou and J. D. Sergi, "Simultaneous Track-to-Track Association and Bias Removal Using Multistart Local Search," Aerospace Conference, 2008 IEEE. IEEE, Mar. 2008, pp. 1-14, United States.

C. Yang, E P. Blasch, J. A. Patrick, and D. Qiu, "Ground target track bias estimation using opportunistic road information," (NAECON) Proceedings of the National Aerospace and Electronics Conference IEEE 2010, Jul. 2010, pp. 156-163, United States.

M. Ulmke and W. Koch, "Road-map assisted ground moving target tracking," Aerospace and Electronic Systems, IEEE Transactions on, vol. 42, No. 4, pp. 1264-1274, Oct. 2006, United States.

H. Zhu, S. Chen, C. Han, and Y. Lin, "Fusion of possible biased local estimates in sensor network based on sensor selection," Information Fusion, 2013 16th International Conference on. IEEE, Jul. 2013, pp. 357-364, Turkey.

D. Belfadel, R. W. Osborne, and Y. Bar-Shalom, "Bias estimation for optical sensor measurements with targets of opportunity," Information Fusion (FUSION), 2013 16th International Conference on. IEEE, Jul. 2013, pp. 1805-1812, Turkey.

E. Taghavi, R. Tharmarasa, T. Kirubarajan, and Y. Bar-Shalom, "Bias estimation for practical distributed -nultiradar-multitarget tracking systems," Information Fusion, 2013 16th International Conference on. IEEE, Jul. 2013, pp. 1304-1311, Turkey.

S. Brakatsoulas, D. Pfoser, R. Salas, and C. Wenk, "On mapmatching vehicle tracking data," Proceedings of the 31st international conference on Very large data bases, ser. VLDB '05. VLDB Endowment, 2005, pp. 853-864, Norway.

C. Wenk, R. Salas, and D. Pfoser, "Addressing the Need for Map-Matching Speed: Localizing Global Curve-Matching Algorithms," 18th International Conference on Scientific and Statistical Database Management, 2006, IEEE, 2006, pp. 379-388, Austria.

11. M. A. Quddus, W. Y. Ochieng, and R. B. Noland, "Current map-matching algorithms for transport applications: State-of-the art and future research directions," Transportation Research Part C: Emerging Technologies, vol. 15, No. 5, pp. 312-328, 2007.

D. Chen, A. Driemel, L. J. Guibas, A. Nguyen, and C. Wenk, "Approximate Map Matching with respect to the Frechet Distance," ALENIX, 2011, pp. 75-83, United States.

T. Hunter, P. Abbeel, and A. Bayen, "The Path Inference Filter: Model-Based Low-Latency Map Matching of Probe Vehicle Data," Algorithmic Foundations of Robotics X, ser. Springer Tracts in Advanced Robotics, Springer Berlin Heidelberg, 2013, vol. 86, pp. 591-607.

R. Hartley and A. Zisserman, Multiple View Geometry in Computer Vision, 2nd ed. Cambridge University Press, chapter 4, pp. 87-131, Apr. 2004, United States.

H. Alt and M. Godau, "Computing the Frechet distance between two polygonal curves," International Journal of Computational Geometry & Applications, vol. 5, Nos. 1 & 2, pp. 75-91, 1995, United States.

T. Eiter and H. Mannila, "Computing Discrete Frechet Distance," Christian Doppler Laboratory for Expert Systems, TU Vienna, Austria, Tech. Rep., 1994, technical Report CD-TR 94/64, Austria.

H. Alt, A. Efrat, G. Rote, and C. Wenk, "Matching planar maps," J. Algorithms, vol. 49, No. 2, pp. 262-283, Nov. 2003.

R. Van Oostrum and R. C. Veltkamp, "Parametric search made practical," Computational Geometry, vol. 28, No. 2-3, pp. 75-88, Jun. 2004, Canada.

B. Aronov, S. H. Peled, C. Knauer, Y. Wang, and C. Wenk, "Frechet distance for curves, revisited," Proceedings of the 14th conference on Annual European Symposium—vol. 14, ser. ESA '06. London, UK, UK: Springer-Verlag, 2006, pp. 52-63, United Kingdom.

M. A. Fischler and R. C. Bolles, "Random Sample Consensus: A Paradigm for Model Fitting with Applications to Image Analysis and Automated Cartography," Communications of the ACM, vol. 24, No. 6, pp. 381-395, Jun. 1981, United States.

P. J. Rousseeuw, "Least Median of Squares Regression," Journal of the American Statistical Association, vol. 79, No. 388, pp. 871-880, Dec. 1984, United States.

OpenCV (Open Source Computer Vision Library) OpenCV User Site [online], retrieved on Jan. 24, 2018, retrieved from http://opencv.org/.

Z. Danziger, "Discrete Frechet Distance," v. 1.4 [online], retrieved in 2013, retrieved from http://www.mathworks.com/matlabcentra/fileexchange/31922-discrete-frechet-distance.

21. K Yamaguchi, "mexopencv—matlab mex functions for opencv," [online] retrieved on Jan. 23, 2018, retrieved from https://kyamagu.github.io/mexopencv/.

Lingji Chen and Ravi Ravichandran, "Automated Track Projection Bias Removal Using Frechet Distance and Road Networks," Fusion 2014, Spain.

Wikipedia, "Frechet distance," [online], retrieved on Jan. 24, 2018, retrieved from https://en.wikipedia.org/wiki/Fr%C3%A9chet_distance.

Wikipedia, "RANSAC," [online], retrieved on Jan. 24, 2018, retrieved from https://en.wikipedia.org/wiki/Random_sample_consensus.

Wikipedia, "k-d tree," [online], retrieved on Jan. 24, 2018, retrieved from https://en.wikipedia.org/wiki/K-d_tree.

A. Tagliasacchi, "kd-tree for Matlab," [online] [bulletin board] retrieved on Jan. 24, 2018, retrieved from http://www.mathworks.com/matlabcentral/fileexchange/21512-kd-tree-for-matlab.

* cited by examiner

AUTOMATED TRACK PROJECTION BIAS REMOVAL USING FRECHET DISTANCE AND ROAD NETWORKS

CROSS REFERENCE TO RELATED APPLICATION

This application claims benefit of U.S. Provisional Application Ser. No. 62/000,839, entitled, "Automated Track Projection Bias Removal Using Frechet Distance and Road Networks" filed May 20, 2014, the entire disclosure of which is incorporated herein by reference.

STATEMENT OF GOVERNMENT INTEREST

This invention was made with United States Government support under Contract No. HQ0034-12-C-0050 awarded by the Department of Defense. The United States Government has certain rights in this invention.

FIELD OF INVENTION

The invention relates to target tracks produced by EO/IR sensors above the surface of the Earth and more particularly to a system for automatically removing bias in a track generated by the sensors and projected to the surface of the Earth where the track is to match corresponding surface features.

BACKGROUND OF THE INVENTION

Target tracks produced by EO/IR sensors often need to be projected onto the surface of the Earth for subsequent display or for fusion with tracks produced by other sensors. A bias in the parameters used for this projection, for example, heading or pitch of the platform that carries the sensors, leads to a projective bias in the ground tracks. When target tracks produced by a video tracker are projected to the Earth's surface, they often become a rotated, stretched and translated version of the true tracks due to sensor calibration errors. If the correspondence between the projected tracks and the roads they are on can be established, a homography can then be computed and the projection bias can be removed. This correspondence is typically easy to establish by a human operator. However, it is desirable to have an automated solution to reduce an operator's work load, and the problem is challenging due to the lack of fiduciary targets. A fiduciary target is a point on a track whose position on a corresponding road is known. These fiduciary targets are not automatically generated in surveillance settings and such fiduciary targets to correct for bias errors are therefore unavailable for use in bias correction.

More particularly, there is a need to align the tracks projected from an overflying video camera onto road networks. The tracks referred to herein correspond to positions of a moving target. As the target moves along it is detected by different sensors, such as, for instance those associated with radar measurements, and for instance, video cameras mounted on highflying unmanned aerial vehicles. These sensors look down and identify cars or vehicles. The purpose of such a system is to be able to track the vehicles on a map and to identify these vehicles at projections on corresponding roads.

Moreover there is a further need for fusing tracking information from different modalities and different sensors, and to do so in one coherent picture. For instance, if the tracks are those obtained from radars, the projected radar tracks are to be aligned with corresponding tracks obtained from video cameras. It is, therefore, important that these projected tracks be fused. As a result, when the vehicles are detected by multiple sensors it is important to be able to align the projected tracks of each of these sensors with themselves as well as with the road network.

With the problem of bias, if the camera is mounted on a stable platform at a certain altitude, there may be a slight deviation of the platform from the stable position. But that slight deviation can rotate a projected track off a road. Thus, these slight deviation-caused bias errors need to be canceled out so that the tracks projected from an aerial reconnaissance vehicle align with the road network.

By way of further background, typically when a vehicle is tracked utilizing a video framework it is common to put a box around a vehicle and then follow the vehicle. The box can completely surround that particular vehicle, and when it is determined where the vehicle is positioned, the location of the vehicle must then be projected on the ground. Because of bias errors, the vehicle may be, for example, 5 meters off road in any given direction. Knowing the projected position of the vehicle on the ground, one then needs to define a translation in terms of a contraction or elongation corresponding to the bias so as to be able to move the projected position of the vehicle to the true or actual position on the road and correct the bias.

Moreover, in the past when video tracks were taken and projected on the ground, and subsequently filled with radar tracks, these tracks did not overlie each other. This error is because the two tracks did not align with the road and did not align with themselves. The correspondence between the video and radar tracks, and between these tracks and a true position on the ground, can be established in a manual process and then tabulated to rotate the tracks back to the road. However, as mentioned herein, this process is not a satisfactory solution since it requires manual bias correction.

Track bias removal has been studied extensively and many methods have been proposed in the prior art. One study includes considerations of the problem of removing biases by the fusion center from state estimates produced by local, bias-ignorant trackers, when track-to-track association is known. Another study analyzes the problem of calculating the probability of track-to-track association given data from biased sensors. Another study has analyzed the problem of jointly obtaining the optimal track-to-track association and the estimation of the (relative, additive) sensor bias is formulated as a nonlinear mixed integer programming problem and solved using a multistart local search heuristic.

Still further studies have obtained matchings of biased tracks to roads by treating both the road network and the tracks as binary images, and using feature finding methods in image processing. When roads are dense and similar, the most prominent features are often the turns or intersections. This study considered not only the turns, but all points on a track/road. In a similar study, measurements were filtered into tracks with road map assistance, and intersecting roads were handled with an interacting multiple model (IMM) scheme. More recent studies have dealt with bias estimation/removal through the fusion of possible biased local estimates in sensor network based on sensor selection, through estimation of optical sensor measurements with targets of opportunity, and with bias estimation for practical distributed multiradar-multitarget tracking systems, among others.

Some prior art have used Global Positioning Systems (GPS) to propose solutions. However, a problem with GPS is that in order to obtain a smooth track on the road, based on recorded noisy dots that can be off the road, the system has to account for several sources of noises. As a result, the criteria on the quality of the obtained tracks have to take many factors into account. Thus, solutions to the GPS problem do not readily provide a solution to the problem of projection bias removal, which is narrowly but precisely formulated and requires a precise solution.

All of the proposed solutions to the topic have shortcomings which make these solutions inadequate for correcting the biased track positions to their true track positions. Thus, a heretofore unaddressed need exists in the industry to address the aforementioned deficiencies and inadequacies.

SUMMARY OF THE INVENTION

Embodiments of the present disclosure provide a system and method for projecting target tracks produced by a remote sensor onto a surface of the Earth to obtain projected tracks on a planar map for removing projection bias in the projected track. Briefly described, in architecture, one embodiment of the system, among others, can be implemented as follows. A bias removal module is adapted to receive signals from a remote sensor scanning a predetermined portion of the surface of the Earth and for projecting from said received signals a track of a target on a planar map corresponding to said predetermined portion of the surface of the earth. The bias removal module includes a discrete Frechet distance measuring module for computing a discrete Frechet distance from a track portion associated with a track derived from said remote sensor to a corresponding track portion on said planar map. A processor automatically establishes, from said discrete Frechet distance, a correspondence between the projected track portion and a corresponding track portion on said planar map. A bias removal unit removes projection bias based on said correspondence.

The present disclosure can also be viewed as providing methods for projecting target tracks produced by a remote tracker onto a surface of the Earth to obtain projected tracks. In this regard, one embodiment of such a method, among others, can be broadly summarized by the following steps: removing projection bias in a projected track from the remote tracker projected onto a planar map by computing a discrete Frechet distance from a polygonal curve associated with a track derived from the remote tracker to a corresponding polygonal curve on the planar map; automatically establishing a correspondence between the projected track and a track on the planar map; and removing a projection bias based on the correspondence.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

In order to automatically eliminate projection bias without the use of fiducial targets, an automatic bias error correction system utilizes discrete Frechet distance measured from sensor tracks to corresponding tracks on a planar map. Rather than utilizing a continuous Frechet function, the discrete Frechet distance involves taking a track, characterizing a track section as a polygon curve having endpoints and detecting the distance between corresponding endpoints of tracks and the corresponding endpoints of polygon curves representing the road network. Having derived the discrete Frechet distances, these distances are then utilized to compute a homography or projective transform of each point on the biased track to correct it to remove the bias. Thus, the Frechet distance is used to determine what is closest in establishing correspondence between a projected track portion and a corresponding track portion on a planar map that is closest to the projected track portion. Applying the homography can result in a corrected track.

Homography is an isomorphism of projective spaces, induced by an isomorphism of the vector spaces from which they are derived. Homography uses a bijection, a projection that maps lines to lines from one projective space to another, or from a projective space to itself, such that the images of collinear points are themselves collinear. In computer vision, images of the same planar surface are related by a homography. Relative to camera motion, namely rotation and translation between two images, once the camera rotation and translation have been extracted from an estimated homography matrix, this information may be used for translating an image point on a map to remove camera rotation and translation. The points on a biased track can be translated to points on a corrected track, thus eliminating bias error.

Among many benefits of the present disclosure, two important benefits are: first, a novel algorithm that extends the map matching algorithm to the discrete case in which track sections are converted to straight-line polygon curve segments having endpoints, and the discrete distance is measured to corresponding end points of corresponding track segments on a planar map; and second, homography based on these discrete Frechet measurements is used to provide corrected tracks to solve the problem of automated bias removal without fiduciary tracks. These unique nodes are the endpoints of polygonal curves that are used by a discrete Frechet distance measuring system to obtain how close a given track is to a given road network segment.

In one embodiment, the first step is to obtain roadwork data as a graph of unique points as nodes and adjacency of nodes. For each biased track, a matching algorithm may be run utilizing the discrete Frechet distance to obtain the closest road segment, referred to herein as a 'matching'. The next step is to extract matched lines from each matching. The algorithm computes a homography utilizing all matched lines. The next step is to use the computed homography to transform each point on the biased track to obtain a corresponding point on the corrected track. Thereafter, a track of the vehicle detected by the sensors is generated which is a result of the homography transformation. The result is the automatic elimination of bias error in the projected tracks from an overflying vehicle carrying cameras and radars without the use of fiducial points.

Figure 1:
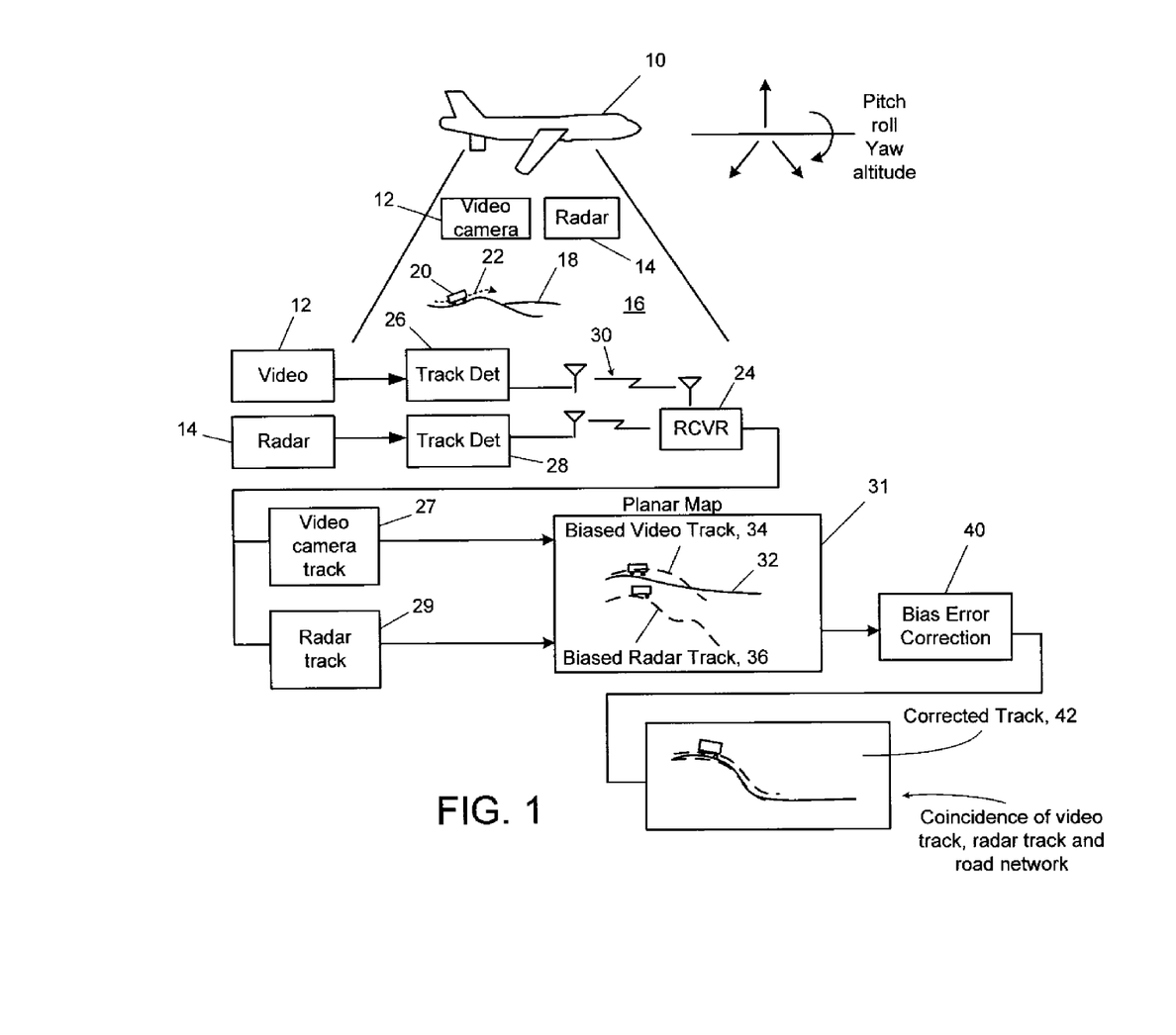
FIG. 1 is a schematic illustration of the projection of a video and radar tracks from an overflying vehicle onto a planner map of the surface of the Earth, showing bias error for both the video track and the radar tracks and a system for bias error correction, in accordance with a first exemplary embodiment of the present disclosure.

FIG. 1 is a schematic illustration of the projection of a video and radar tracks from an overflying vehicle 10 onto a planar map of the surface of the Earth, showing bias error for both the video track and the radar tracks and a system for bias error correction, in accordance with a first exemplary embodiment of the present disclosure. An overflying unmanned aerial vehicle 10 is provided with a video camera 12 and radar 14 which scan the surface 16 of the Earth. A road network 18 is depicted as having a vehicle 20 traversing the road network in the direction of dotted arrow 22. The detected track of the vehicle 20 is sensed by the sensors aboard unmanned aerial vehicle 10, with the track being transmitted to the surface of the Earth where the tracking information is received by a receiver 24. Video camera 12 and radar 14 are provided with track detection modules 26 and 28, the results of which are transmitted wirelessly through a wireless signal 30 to receiver 24. The output of receiver 24 is coupled to a video camera tracking unit 27, and to a radar tracking unit 29 to provide a projection of the tracks on planar map 31 which carries a representation of the road network thereon.

As is shown, there is a biased video track 34 which sits above the true track 32, whereas there is a biased radar track 36 which sits below the true track 32, both biased tracks having bias tracking errors. The subject disclosure may be used to remove the biasing that results in the displacement of the video track, described by a homography, with respect to the true track. To this end, a bias error correction module 40 is used to remove the bias errors in the video track 34 to provide a corrected track 42 in which video track 34 and radar track 36 are superimposed on one another, and are corrected to lie on the road network. Thus, once the projection of the tracks is completed, the video track 34 or ground tracks can be moved or de-biased so they are better aligned with the true track 32 of the roads. This process may provide an accurate rendering of the position of vehicle 20 on true track 32 so that the vehicle 20 may be accurately depicted on the planar map in terms of exact location along the road network.

Figure 2:
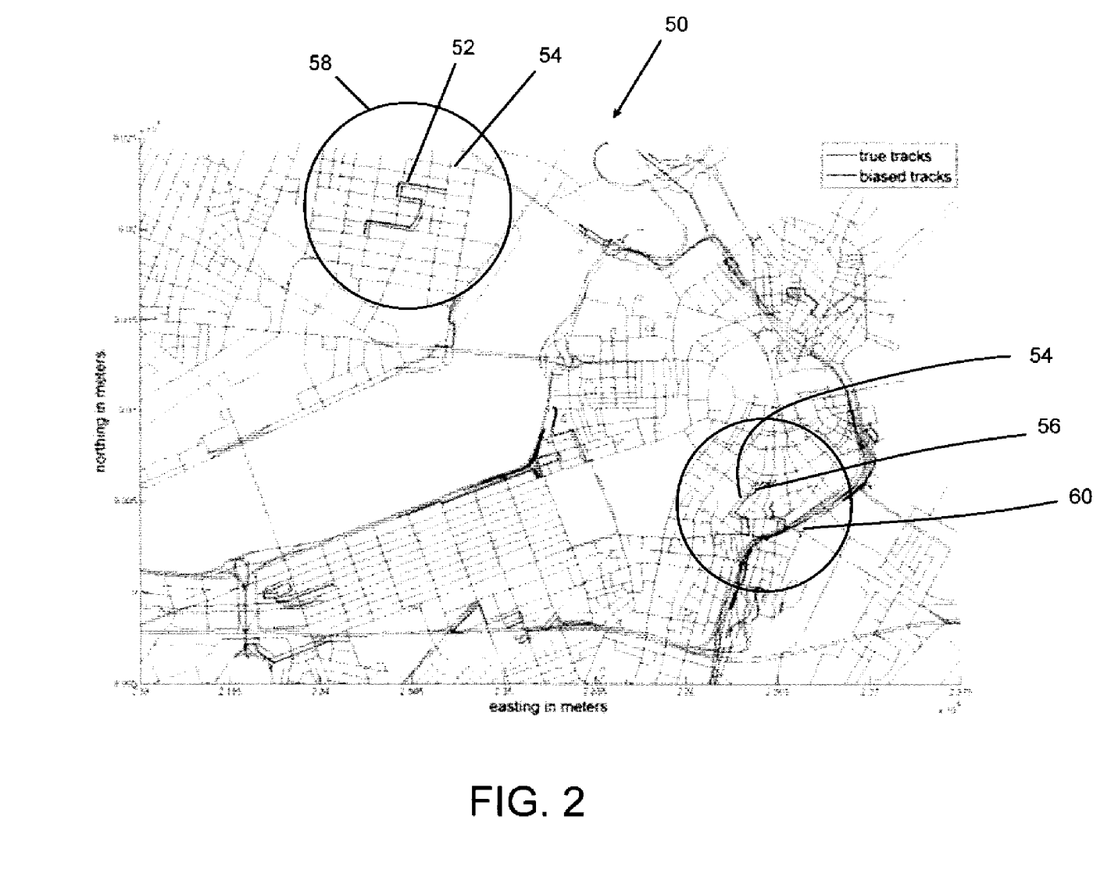
FIG. 2 is a diagrammatic illustration of a map of a road network with simulated true tracks and biased tracks, in accordance with the first exemplary embodiment of the present disclosure.

FIG. 2 is a diagrammatic illustration of a map of a road network 50 with simulated true tracks and biased tracks, in accordance with the first exemplary embodiment of the present disclosure. FIG. 2 shows a simulated example using the road networks 50 on a map of an area, where true tracks are shown in light lines and biased tracks are shown in heavier lines. The details of data generation will be presented below. It can be seen that on the upper left encircled portion of the map, the biased tracks 52 are to the left of the true tracks 54, while on the lower right encircled area, the biased tracks 56 are to the right of true track 54.

Figure 3:
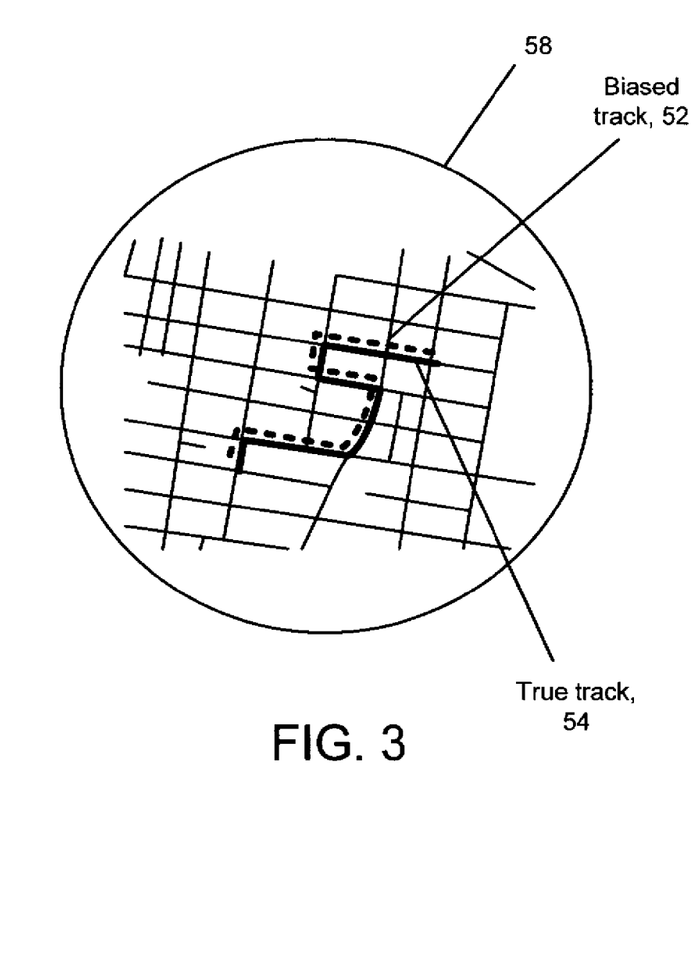
FIG. 3 is a diagrammatic illustration of a portion of the map of FIG. 2, showing a departure of a biased track from a true track in one direction, in accordance with the first exemplary embodiment of the present disclosure.
Figure 4:
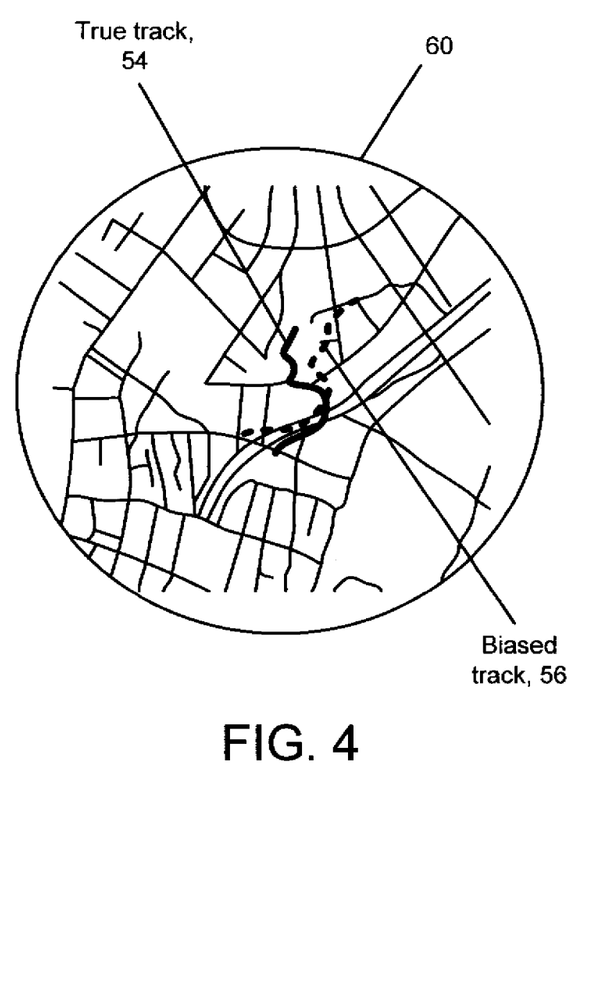
FIG. 4 is a diagrammatic illustration of a portion of the map of FIG. 2, showing a deviation of the biased track from true track in a direction opposite to that shown in FIG. 3, in accordance with the first exemplary embodiment of the present disclosure.

FIG. 3 is a diagrammatic illustration of a portion of the map of FIG. 2, showing a departure of a biased track from a true track in one direction, in accordance with the first exemplary embodiment of the present disclosure. FIG. 4 is a diagrammatic illustration of a portion of the map of FIG. 2, showing a deviation of the biased track from true track in a direction opposite to that shown in FIG. 3, in accordance with the first exemplary embodiment of the present disclosure. With reference to FIGS. 2-4, each of these tracks within the encircled portion of FIG. 2 is shown in detail in FIGS. 3-4, such that the areas encircled by circles 58 and 60 in FIG. 2 correspond to the map segments of FIGS. 3 and 4, respectively. Referring to FIG. 3, biased track 52 is shown displaced from true track 54 such that it is not possible, for instance, to tell at what point a vehicle on the biased track is coincident with a point on the true track. Referring to FIG. 4, the area 60 shows the biased track 56 is below true track 54 in a direction opposite to the bias depicted in FIG. 3.

Figure 5:
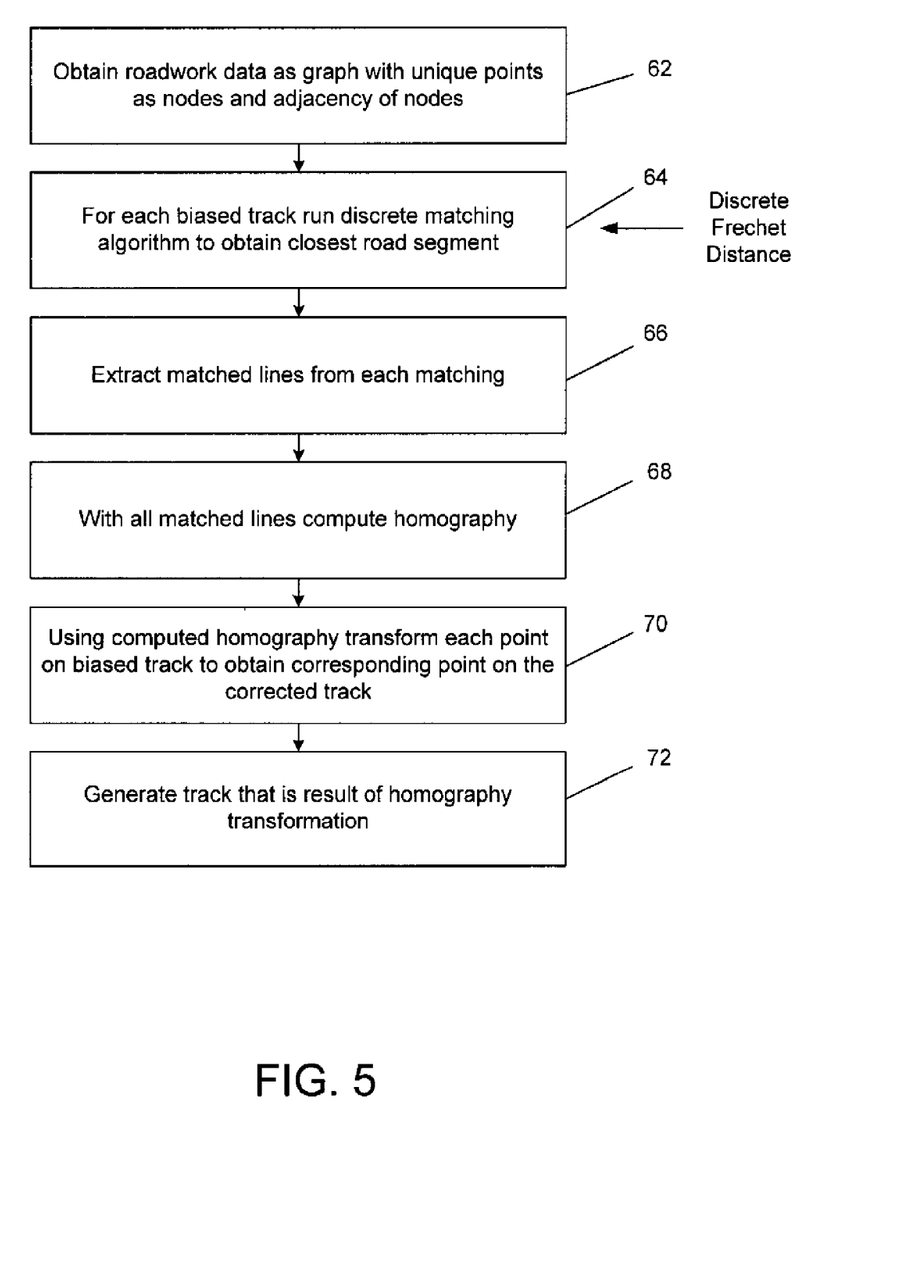
FIG. 5 is a flowchart showing the bias error correction system of FIG. 1 showing the running of a discrete Frechet distance measuring system to obtain the closest road segment on a road network followed by the extraction of matching lines, and the computation of a homography, followed by transforming of each point on a biased track to obtain a corresponding point on a corrected track, thus to remove bias error, in accordance with the first exemplary embodiment of the present disclosure.

FIG. 5 is a flowchart showing the bias error correction system of FIG. 1 showing the running of a discrete Frechet distance measuring system to obtain the closest road segment on a road network followed by the extraction of matching lines, and the computation of a homography, which is a mathematical quantity summarizing the combined effect of rotation, translation and stretching, followed by transforming of each point on a biased track to obtain a corresponding point on a corrected track, thus to remove bias error, in accordance with the first exemplary embodiment of the present disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

The flowchart of FIG. 5 describes the operation of bias error correction module 40 of FIG. 1. Here, the first step 62 is to obtain roadwork data as a graph of unique points as nodes and adjacency of nodes. These unique nodes are the endpoints of polygonal curves that are used by a discrete Frechet distance algorithm to obtain how close a given track is to a given road network segment.

At the second step 64, for each biased track, a matching algorithm is run that utilizes the discrete Frechet distance measuring algorithm to obtain the closest road segment. At the third step 66, matched lines are extracted from each matching. At the fourth step 68, the algorithm computes a homography utilizing all matched lines. At the fifth step 70, a computed homography is used to transform each point on the biased track to obtain a corresponding point on the corrected track. Thereafter, as illustrated at the sixth step 72, a corrected vehicle track is generated that is the result of the homography or homographic transformation. The result is the automatic elimination of bias error in the projected tracks from an overflying vehicle carrying remote sensors such as cameras and radars without the use of fiducial points.

Figure 6:
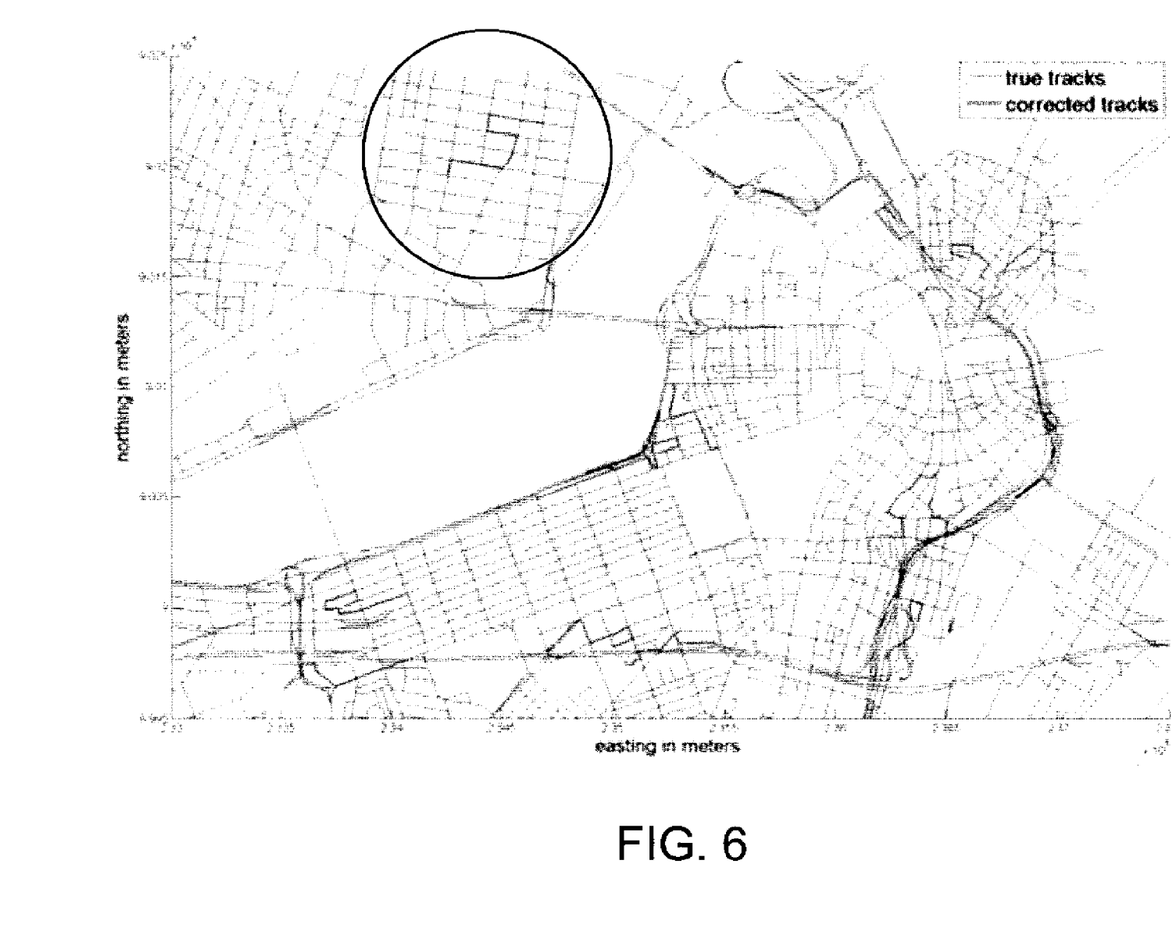
FIG. 6 is a diagrammatic illustration of the map of FIG. 1 showing correction of tracks to correspond to true tracks, with the former overlaying the latter, in accordance with the first exemplary embodiment of the present disclosure.

FIG. 6 is a diagrammatic illustration of the map of FIG. 1 showing correction of tracks to correspond to true tracks, with the former overlaying the latter, in accordance with the first exemplary embodiment of the present disclosure. The result of the bias removal associated with the flowchart of FIG. 5 is illustrated in FIG. 6 to show that both the video track and the radar track are coincident with each other and directly overlie the road network with no bias error. This result is discussed in detail below, relative to specific aspects of the present disclosure. Specifically, these aspects include: a summary of formulas used to find a homography from matched lines, a discrete map matching algorithm based on discrete Frechet distance, automated bias removal, and the efficacy of the approach using simulated tracks.

I. Finding Homography from Matched Lines

Before an automated procedure is presented, what is first described is how the bias correction task can be performed manually. One can visually inspect a biased track and compare it with the road segments "nearby" on the given road network, and if one believes that one has found a match, the correspondence between the line segments in the tracks and the line segments on the road can be marked. Repeating this process for many biased tracks, it is possible to obtain many pairs of matchings and eventually arrive at a solution for the homography through the matched lines.

A number of formulas may be used, each of which is summarized here. Let $[x_1, x_2]^T$ be a point in a plane (where a superscript T denotes transpose). Since a line in the plane is represented by an equation such as $ax_1+bx_2+c=0$, the line is identified with the homogeneous point $[a; b; c]^T$. With the homogeneous representation $x \triangleq [x_1, x_2, 1]^T$ of the point $[x_1, x_2]^T$, one sees that the point x lies on the line $l \triangleq [a, b, c]^T$ if and only if their inner product is zero, i.e., $x^T l = 0$. In the following one drops the bold face for vectors when the meaning is clear from context.

Let H be the 3×3 homography matrix that transforms a homogeneous point x into x', i.e., x'=Hx.

If l is a line passing through x, then $l'=H^{-T}l$ is a line passing through x', because $x'^T l'=(x^T H^T)(H^{-T}l)=x^T l=0$.

Thus, if one treats l' and l as homogeneous points and finds the homography that transforms the former to the latter, then the transpose of the found homography is H since $H^T l'=l$.

Noted in passing, when one identifies a line segment $l_{ab}$ using its two end points $x_a$ and $x_b$, the homogeneous representation of the line is given by the cross product of the homogeneous representations of the end points, i.e., $l_{ab}=x_a \times x_b$.

It can be readily verified that $x_a$ is on the line because $x_a^T l_{ab}=0$, and so is $x_b$.

How to compute homography, especially in a robust fashion, can be found in the prior art, such as within R. Hartley and A. Zisserman, Multiple View Geometry in Computer Vision, 2nd ed. Cambridge University Press, April 2004. Therefore, it is not described herein in detail.

It is now clear that one way to automate the batched process of removing the projective bias discussed earlier is to automate the matching of biased tracks to the road segments on the road network. In the following what is presented, is an algorithm that maps a polygonal curve to segments on a planar map based on the discrete Frechet distance.

II. Frechet Distance and Map Matching

A. Continuous Frechet Distance

The Frechet distance is a measure of similarity between curves that takes into account the location and ordering of the points along the curves. Intuitively, the Frechet distance between two curves is the minimum length of a leash required to connect a dog and its owner, constrained on two separate paths, as they walk without backtracking along their respective curves from one endpoint to the other.

More specifically, let f: [a, a']→$\Re^2$ and g: [b, b']→$\Re^2$ be curves. Then their Frechet distance is defined as $$\delta_F(f, g) \triangleq \inf_{\alpha,\beta} \max_{t \in [0,1]} d(f(\alpha(t)), g(\beta(t))),$$

where d(•,•) is a chosen distance function, and α: [0, 1]→[a, a'] and β: [0, 1]→[b, b'] range over continuous and nondecreasing functions only (and represent a choice of walking the dog in the analogy).

Figure 7A:
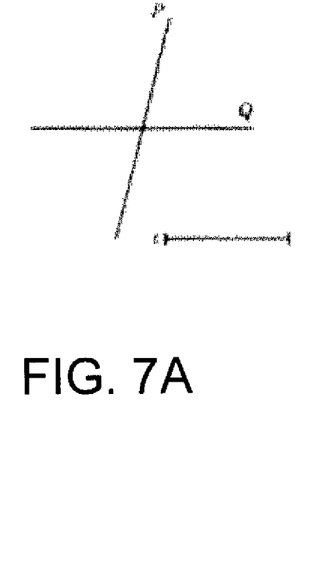
FIGS. 7A and 7B are corresponding diagrammatic illustrations showing two line segments and a given distance in FIG. 7A and the corresponding free space in white in FIG. 7B, in accordance with the first exemplary embodiment of the present disclosure.
Figure 7B:
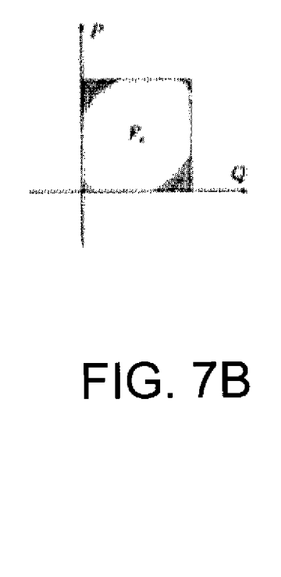

An algorithm may be used to compute the Frechet distance between two polygonal curves based on the idea of a free space. FIGS. 7A and 7B are corresponding diagrammatic illustrations showing two line segments and a given distance in FIG. 7A and the corresponding free space in white in FIG. 7B, in accordance with the first exemplary embodiment of the present disclosure. As illustrated in FIGS. 7A-7B, if P and Q are two line segments, then the free space $F_\epsilon$ describes all pairs of points, one on P and one on Q, whose distance is at most ε: $F_\epsilon \triangleq \{(s, t) \in [0, 1]^2 | d(P(s), Q(t)) \leq \epsilon\}$. This concept is illustrated in FIGS. 7A-7B.

Figure 8A:
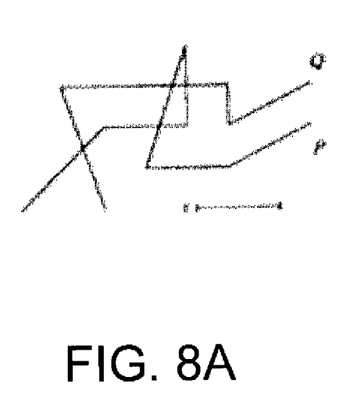
FIGS. 8A and 8B are corresponding diagrammatic illustrations showing two polygonal curves and a given distance in FIG. 8A and the corresponding free space in white in FIG. 8B, in accordance with the first exemplary embodiment of the present disclosure.
Figure 8B:
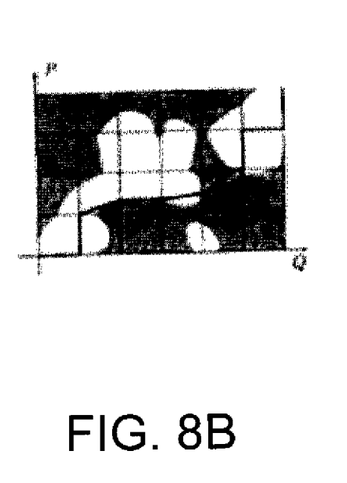

The same concept is generalized to polygonal curves and illustrated in FIGS. 8A-8B. FIGS. 8A and 8B are corresponding diagrammatic illustrations showing two polygonal curves and a given distance in FIG. 8A and the corresponding free space in white in FIG. 8B, in accordance with the first exemplary embodiment of the present disclosure. It is proved that $\delta_F \leq \epsilon$ holds exactly if there exists a curve within the free space $F_\epsilon$ from the lower left corner to the upper right corner which is monotone in both coordinates. Thus the Frechet distance can be found through a search procedure, by checking at each iteration whether a connecting curve exists.

B. Discrete Frechet Distance

The algorithm used to compute the Frechet distance between two polygonal curves based on the idea of a free space, used to determine the existence of a connecting curve, is quite elaborate and not straightforward to implement. However, a discrete counterpart can be used where only distances between the end points of the polygonal curves are considered.

More specifically, let P and Q be polygonal curves defined by the end points $(u_1, u_2, \ldots, u_p)$ and $(v_1, v_2, \ldots, v_q)$ respectively. Note, the notation P(i) is used to denote $u_i$. A non-backtracking discrete walk of P with length m is defined by a sequence of m indices $\alpha = \{\alpha_1 = 1, \alpha_2, \ldots, \alpha_m = p\}$ such that the walker either stops, i.e., $\alpha_{i+1} = \alpha_i$, or goes one step forward, i.e., $\alpha_{i+1} = \alpha_i + 1$. Then the discrete Frechet distance between P and Q is defined by:

$$\delta_{dF}(P, Q) \triangleq \inf_{m, \alpha, \beta} \max_{k=1, \ldots, m} d(P(\alpha_k), Q(\beta_k)),$$

where $d(\bullet, \bullet)$ is a chosen distance function, and $\alpha$ and $\beta$ are non-backtracking discrete walks of P and Q with length m respectively.

It is easy to see that if one "subdivides" the two polygonal curves further and further, their discrete Frechet distance $\delta_{dF}$ should approach their continuous Frechet distance $\delta_F$. In fact, the following bounds are established: $\delta_F(P, Q) \leq \delta_{dF}(P, Q) \leq \delta_F(P, Q) + l_{max}$, where $l_{max}$ is the largest among the segment lengths of P and Q.

The discrete Frechet distance, and the corresponding walk, can be computed directly using dynamic programming, such as on MATLAB.

C. Continuous Map Matching

Figure 9A:
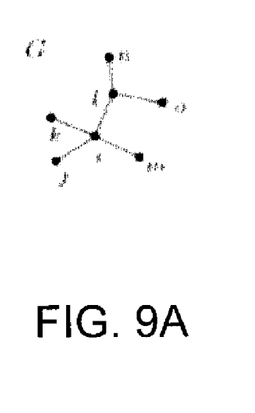
FIGS. 9A and 9B are corresponding diagrammatic illustrations showing the planar map G in FIG. 9A and the free space surface formed by the free space diagrams glued together in FIG. 9B, in accordance with the first exemplary embodiment of the present disclosure.
Figure 9B:
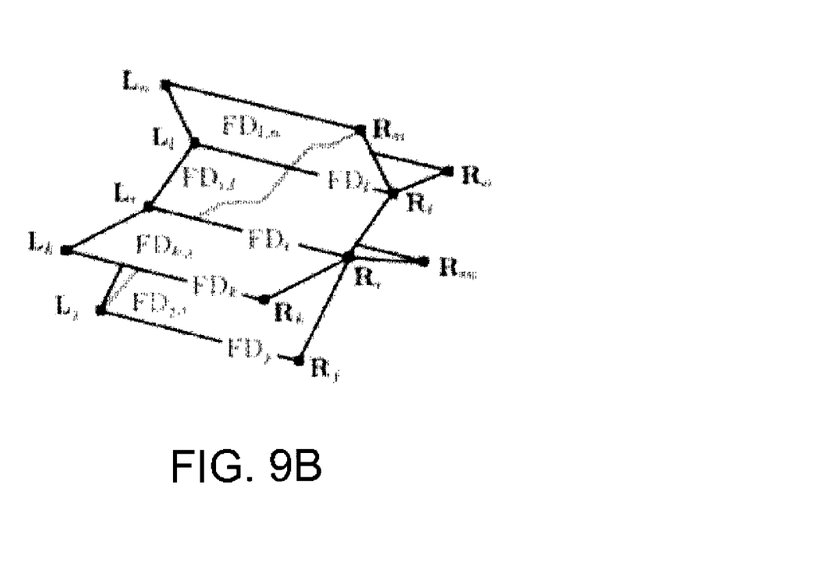

The concept of the free space to the case of a polygonal curve and a planar map can be extended in order to find the matching line segments in the planar map that are closest to the polygonal curve according to the continuous Frechet distance. This idea is illustrated in FIGS. 9A and 9B, which are corresponding diagrammatic illustrations showing the planar map G in FIG. 9A and the free space surface formed by the free space diagrams glued together in FIG. 9B, in accordance with the first exemplary embodiment of the present disclosure. In FIGS. 9A-9B, the graph G is 'on the paper' as are the 'L' points, with the 'R' points 'sticking out of the paper', with the gray curve illustrating a nondecreasing path through the free space.

Once again, this algorithm called continuous map matching is quite elaborate and not straightforward to implement. It is desirable to use the discrete Frechet distance, but the dynamic programming approach for two curves does not seem to be readily extendable to the case of a curve and a map.

D. Discrete Map Matching

A discrete version of the map matching algorithm has been developed by adopting the idea of the free space but restricting attention to only the segment end points in the polygonal curves. This version is achieved by first constructing a free space graph. The construction of the free space graph can be qualitatively described as follows: given a polygonal curve P and a planar graph (or map) G; take the natural ordering of the $n_P$ segment end points (or nodes) of P and mark the sequence on a horizontal line; take any ordering of the nG nodes of the map G and mark the sequence on a vertical line; then create a free space graph with $n_G \times n_P$ nodes.

Figure 10A:
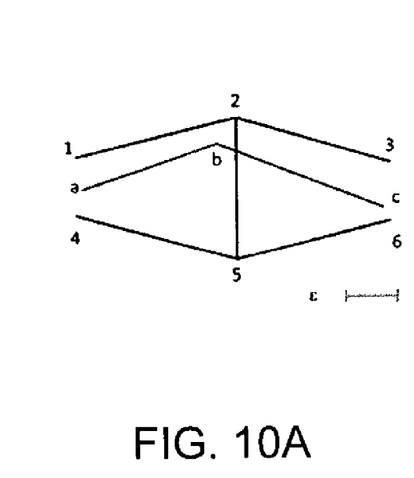
FIGS. 10A and 10B are corresponding diagrammatic illustrations showing a map and a polygonal curve in FIG. 10A and the free space graph constructed for a given distance $\epsilon$ where free nodes are denoted by a solid rectangle in FIG. 10B, in accordance with the first exemplary embodiment of the present disclosure.
Figure 10B:
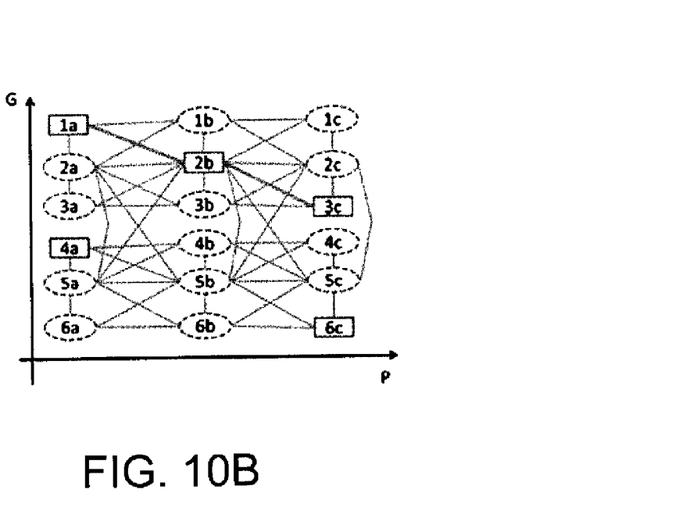

FIGS. 10A and 10B are corresponding diagrammatic illustrations showing a map and a polygonal curve in FIG. 10A and the free space graph constructed for a given distance $\epsilon$ where free nodes are denoted by a solid rectangle in FIG. 10B, in accordance with the first exemplary embodiment of the present disclosure. Each column of nodes in the free space graph is a replica of the nodes in G, and has a corresponding "node position" in P. In FIG. 10A, a map and a polygonal curve is shown, with nodes for the map denoted by '1' through '6' while nodes for the polygonal curve are denoted as 'a' through 'c' is used.

Two nodes in the same column are connected if their "original" nodes are connected in the map G. Two nodes in adjacent columns are connected if they have the same "original" nodes, or if their "original" nodes are connected in G. For a given distance parameter $\epsilon > 0$, mark each node in a column as free (denoted by a solid rectangle in FIG. 10B) if its distance to the node on P that this column corresponds to is less than or equal to $\epsilon$, or not-free (denoted by a dashed ellipse) otherwise.

With the free space graph so constructed, it is straightforward to establish the following:

There exists a path (consisting of line segments) in the map G with a discrete Frechet distance to the polygonal curve P smaller than $\epsilon$, if and only if the free space graph constructed with $\epsilon$ as the distance parameter has a path consisting of only free nodes from the first column on the left to the last column on the right.

The existence of such a path can be decided by adding a source node to the left and a sink node to the right, and calling an algorithm such as Dijkstra's in a standard graph library. Optionally, edge weights can be added to the edges in the free space graph, so that among all valid paths that can establish the discrete Frechet distance upper bound, a "minimum length" path can be chosen that has the least total sum of distances between "coupling" nodes.

The discrete Frechet distance can then be found by a (binary) search on the distance parameter $\epsilon$.

In FIGS. 10A-10B, the path is "$1a \rightarrow 2b \rightarrow 3c$", meaning that the matched line segments in the map are the polygonal curve specified by Nodes 1, 2 and 3. For this example, it is easy to see that the discrete Frechet distance from the track to the road network is equal to the distance between Node 3 and Node c.

III. Automated Bias Removal

The results discussed earlier are combined and an outline of the automated bias removal algorithm, as previously discussed in FIG. 5, is presented. Accordingly, the automated bias removal algorithm includes the following steps:

1) Obtain road network data as a graph. Road network data is typically stored in a shape file that lists each road as a series of points. This has to be converted to a graph with unique points as nodes and with adjacency information between the nodes. Depending on the sampling interval of the tracks to be corrected, a long road may need to be further discretized to have more points on it in order to match the "resolution" of the tracks.

2) For each (biased) track, run the discrete map matching algorithm described in the last section to obtain its closest road segments. If the map is large, a "gating" procedure should be employed first to limit the candidate road segments to be within a certain distance to the track.

3) Extract matched lines from each matching. This can be done approximately: When there is a "simultaneous walk" on both P and Q, the two segments involved can be considered a pair of matched lines.
4) With all the matched lines, compute the homography as described in Section II using an OpenCV option that employs a robust regression method, either RANSAC (Random Sample Consensus) or Least Median of Squares.
5) Using the homography computed, transform each point on the biased track, to obtain its corresponding point on the corrected track (apply the inverse of the transformation.)

Figure 11A:
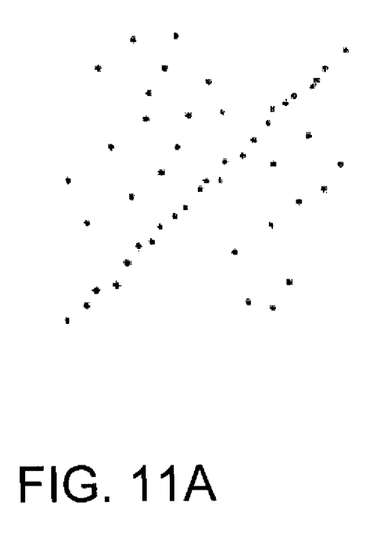
FIGS. 11A and 11B are diagrammatic illustrations showing data plots, with a data set with a line and outliers shown in FIG. 11A and the fitted line using Random Sample Consensus (RANSAC) algorithm shown in FIG. 11B, in accordance with the first exemplary embodiment of the present disclosure.
Figure 11B:
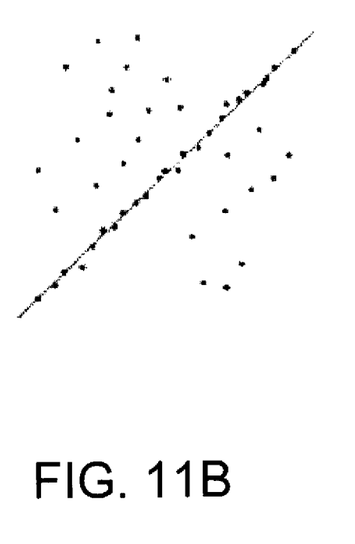

It is noted that the map matching results serve only as an intermediate step; the corrected tracks are not the matched road segments but are the result of a homography transformation. Because of the use of a robust homography finding method that tolerates outliers, the map matching results do not have to be perfect. Depicting the result, FIGS. 11A-11B illustrate the outlier rejection capability of the Random Sample Consensus (RANSAC) algorithm. Specifically, FIGS. 11A and 11B are diagrammatic illustrations showing data plots, with a data set with a line and outliers shown in FIG. 11A and the fitted line using RANSAC shown in FIG. 11B, in accordance with the first exemplary embodiment of the present disclosure.

IV. Simulations

To illustrate the efficacy of the proposed approach, studies were performed using simulated data. Road network data was downloaded from a government website in the form of shape files. A shape file lists each road as a series of points. To extract topological structure from such data, all the points at intersections were determined. Then for each unique point in the road network, adjacent points on roads were listed. The constraints of one-way roads were ignored. This process yields a graph such that the map matching algorithm can be applied. In the map structure, a k-d tree can be included so that when a track is matched against the map, only the portion of the map that is close enough to the track is used.

To perform Monte Carlo simulations, the following method of generating tracks for each simulation were adopted. To start, a random point in the map is selected and a user walked to one of its neighboring points that have not been visited yet. This process is repeated until a track with a given number of points in it is compiled, and the desired number of tracks is achieved. To simulate the projective bias, truth tracks are transformed as follows: a point in the map is chosen to be the center; the tracks are rotated by 0.5 degrees and expanded by 2 percent; and then the tracks are translated by 5 meters to the east and 5 meters to the north. One set of simulated data is shown in FIG. 2.

Map matching for each track is then performed using the subject algorithm. After a matching is obtained, such as "$1a\rightarrow 2b\rightarrow 3c$" as illustrated in FIGS. 10A-10B, a track segment "$a\rightarrow b$" is declared to match the road segment "$1\rightarrow 2$" and the track segment "$b\rightarrow c$" is declared to match the road segment "$2\rightarrow 3$". Such correspondence is not always correct, but is correct most of the time, which gives enough good data to calculate the underlying homography. This calculation is carried out by using a program, such as MATLAB interface to OpenCV called mexopencv, with the Least Median of Squares method.

After the homography is found, it is applied to the biased tracks and corrected tracks are obtained. The bias removal shown in this simulation is almost perfect because the relationship between the truth and biased tracks is indeed characterized by a homography, which has been successfully found through automated matching and robust fitting.

In practice, however, there can be complications. For example, the tracks may be noisy and may not be perfectly on the road even without any projection bias. The spacing of points on a road network may be too large compared to the spacing of points on a track, resulting in matchings that do not reflect the true relationship. The bias is large and the automated matching yields too many outliers. There may be other types of biases present.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A method for projecting target tracks produced by a remote tracker carried by an aerial vehicle onto a surface of the Earth to obtain projected tracks without the use of fiducial targets, the method comprising the steps of:
    overflying the aerial vehicle above the surface of the Earth;
    identifying a bias error in an image captured by the remote tracker carried by the aerial vehicle;
    computing a discrete Frechet distance from a polygonal curve associated with a projected track derived from the remote tracker carried by the aerial vehicle projected onto a planar map to a corresponding polygonal curve on the planar map;
    automatically establishing a correspondence between the projected track and a true track on the planar map; and
    removing a projection bias based on the correspondence in a bias removal module in operative communication with the remote tracker.

2. The method of claim 1, wherein the correspondence includes a homography.

3. The method of claim 2, wherein the homography is used to transform a position of a polygon describing a track segment from the remote tracker to a corresponding position of a polygon representing a road network on the surface of the Earth.

4. The method of claim 3, wherein each of the polygons are defined by endpoints, and wherein the endpoints of each of the polygons are used in computing the discrete Frechet distance.

5. The method of claim 1, wherein removing the projection bias based on the correspondence further comprises obtaining road network data as a graph of unique points as nodes and adjacency of nodes.

6. The method of claim 5, further comprising running a matching algorithm utilizing discrete Frechet distance to obtain a closest road segment.

7. The method of claim 6, further comprising extracting matched lines from each matching.

8. The method of claim 7, further comprising using computed homography to transform each point on the projected track to obtain a corresponding point on a corrected track.

9. The method of claim 8, further comprising generating a track of a target which is the result of the homography transformation, whereby there is an automatic elimination of bias error in the projected tracks without the use of fiducial targets.

10. The method of claim 1, wherein the remote tracker includes a video camera.

11. The method of claim 1, wherein the remote tracker includes a radar system.

12. The method of claim 1, wherein the remote tracker includes multiple sensors that detect the track of a target on the surface of the Earth.

13. The method of claim 12, further comprising fusing the projected tracks from the multiple sensors onto the planar map.

14. The method of claim 13, wherein the removed projection bias places projected tracks from the associated multiple sensors on the true track on the planar map, whereby the tracks from the multiple sensors overlie one another and lie directly on the true track.

15. The method of claim 14, wherein the multiple sensors include at least one of:
   a video camera; and
   a radar system.

16. A system for projecting target tracks produced by a remote sensor carried by an aerial vehicle onto a surface of the Earth to obtain projected tracks on a planar map for removing projection bias in the projected track, comprising:
   a bias removal module adapted to receive signals from a remote sensor scanning a predetermined portion of the surface of the Earth and for projecting from said received signals a track of a target on a planar map corresponding to said predetermined portion of the surface of the Earth, said bias removal module having:
      a discrete Frechet distance measuring module for computing a discrete Frechet distance from a track portion associated with a projected track derived from said remote sensor to a corresponding track portion on said planar map;
      a processor for automatically establishing from said discrete Frechet distance a correspondence between a portion of the projected track and the corresponding track portion on said planar map; and
      a unit for removing projection bias based on said correspondence.

17. The system of claim 16, wherein said correspondence includes a homography.

18. The system of claim 17, wherein said track portion is characterized by a polygon and wherein said homography is used to transform the position of said polygon describing said track portion from said remote sensor to a corresponding position of a polygon representing a road network on the surface of the Earth.

19. The system of claim 18, wherein each polygon is defined by endpoints, and wherein the endpoints of a polygon are used in computing said discrete Frechet distance.

20. The system of claim 16, wherein said remote sensor includes at least one of:
   a video camera; and
   a radar system.

* * * * *